US009734687B1

(12) United States Patent
Santiago

(10) Patent No.: US 9,734,687 B1
(45) Date of Patent: Aug. 15, 2017

(54) BATTERY-LESS TONE SIGNAL REMINDER

(71) Applicant: Elias Santiago, Dacula, GA (US)

(72) Inventor: Elias Santiago, Dacula, GA (US)

(*) Notice: Subject to any disclaimer, the term of this patent is extended or adjusted under 35 U.S.C. 154(b) by 0 days.

(21) Appl. No.: 14/953,042

(22) Filed: Nov. 27, 2015

(51) Int. Cl.

| | |
|---|---|
| ***B60Q 1/00*** | (2006.01) |
| ***G08B 21/02*** | (2006.01) |
| ***G08B 5/22*** | (2006.01) |
| ***G08B 3/10*** | (2006.01) |

(52) U.S. Cl.
CPC ....... *G08B 21/0219* (2013.01); *G08B 3/1025* (2013.01); *G08B 5/224* (2013.01); *G08B 21/0205* (2013.01)

(58) Field of Classification Search
CPC ............ G08B 21/0219; G08B 21/0205; G08B 3/1025; G08B 5/224
See application file for complete search history.

(56) References Cited

U.S. PATENT DOCUMENTS 3,828,341 A * 8/1974 Carter, Jr. .............. G08B 13/24 340/568.7
4,641,124 A * 2/1987 Davis .................. B60R 25/1018 340/426.23
5,844,469 A * 12/1998 Regazzi .................. B60R 25/04 180/287
2003/0132838 A1* 7/2003 Toles .................. B60N 2/0244 340/457
2006/0132293 A1* 6/2006 Andersen ................ B60Q 9/00 340/425.5
2009/0237229 A1* 9/2009 Kautz .................. B60N 2/2812 340/457

* cited by examiner

*Primary Examiner* — Erin File
(74) *Attorney, Agent, or Firm* — Oltman Flynn & Kubler

(57) ABSTRACT

A portable control system reminder device is provided that, when plugged into a vehicle accessory receptacle or socket and the vehicle ignition switch is turned on, will charge a capacitor within the device, and when the vehicle ignition switch is turned off, will discharge this capacitor through a signaling device or circuit producing an alarm signal that will remind the parents or the driver of a vehicle that a child or a pet might be inside the vehicle. A voltage regulator preferably is provided to regulate the voltage for the system and with the purpose of reducing the size of the power storage capacitor.

20 Claims, 6 Drawing Sheets

BATTERY-LESS TONE SIGNAL REMINDER

FILING HISTORY

This application continues from provisional application Ser. No. 62/168,701 filed on May 29, 2015.

BACKGROUND OF THE INVENTION

1. Field of the Invention

The present invention relates generally to the field of automobile safety. More specifically the present invention relates to a reminder device which is either removably or permanently connected to the ignition circuit of a motor vehicle for signaling the driver or a parent when the ignition is shut off to remind the driver or parent of the presence in the vehicle of a child or pet. The reminder device includes a device electric circuit with audio and visual signaling means and a power storage means which is charged with electric power from the vehicle alternator or battery when the vehicle ignition is turned on, and which discharges the stored power through and thereby operates one or both of audio and visual signaling means to perform its reminder function. A key inventive feature of the present device is that the power storage means is a capacitor rather than a battery, which makes the device more reliable, as well as lighter and smaller. A preferred embodiment includes a weight sensor switch placed on, inserted into or manufactured as part of a child car seat. The weight sensor switch is connected to the device circuit by removable leads which are removably attached to jacks on the child car seat, so that the stored power does not discharge through the signaling means such as to sound a buzzer until two conditions are met, namely, that the ignition is shut off and weight is detected in the child car seat, and thereupon the device activates the audio or visual signaling means.

2. Description of the Prior Art

In relatively recent years, child car seats have been provided in motor vehicles to fully secure a child in the event of a vehicle collision. They have been recognized as necessary because conventional seat belts and shoulder straps are sized and positioned to secure adults, and so are not suited to young children and infants. Child car seats have been designed to be secured to the back seat of a vehicle, and therefore are out of the line of vision of the vehicle driver. A problem with child car seats, as a result, has been that the driver may forget that a child is in the seat and may leave the child in the seat when exiting and locking the vehicle. Particularly in geographical regions and during seasons known for high temperatures, the child can and often does die in the vehicle before his or her presence in the vehicle is remembered or discovered. There are more and more accounts of this tragedy in daily news reports. Devices have been developed to alert a driver of the presence of a child in the vehicle before he or she exits and locks the doors, but such devices generally have proven to be unreliable, expensive, bulky, difficult to install, and not readily transferrable to another vehicle, in the event that the driver or parent changes vehicles.

Thus, even though many well intended inventions have been developed to solve this problem, they have not solved it because of the complexity of installation and high cost. Many vehicle owners lack the skill or desire to undertake installation of the devices. The reason for this is that many such installations require alterations to vehicle internal wiring or technology. In addition to the high cost of making changes, many people are reluctant to install the devices because they believe they will adversely affect the operation of the vehicle and its warranty. Reliance on device or system batteries can also make them subject to low battery charge or to batteries that simply are no longer viable, and thus to unexpected failure.

After a careful study of this situation, this inventor has found out that many parents and caregivers are not willing to be connecting and disconnecting cables or equipment extending from a child car seat. This inventor has also found out that many parents prefer to carry their child seat together with the child when they take the child from their home to the vehicle and also when they go shopping or doing other errands. It is obvious that, for the parents, there is little interest in having to connect and disconnect cables or equipment from the child seat each time. Even though the present invention provides a car seat child detection switch, this inventor understands that many parents would prefer a portable reminder unit. After studying thoroughly this situation and most of the prior art this inventor came to the conclusion that a new portable design had to be developed for reminding parents constantly that they should look to the back seat of the vehicle before they leave the vehicle and lock the door. The reminding tone and visual signal should be different from most others tone signals or visual signals that come with the vehicle, so that people can relate this alerts to a child in the car.

What is needed is a reminder device which overcomes the above identified shortcomings to be truly practical. In order for such a new invention to be well accepted by the parents or caregivers of a child, the present inventor understands that such a device should comply with most of the following criteria or specifications:

1. That no installation or technical expertise is required, so that it is easy for a layperson to plug it in to become operational.

2. That the device can perform the function of reminding a vehicle driver or passenger, such as before the vehicle doors are locked, that a child is definitely inside the vehicle.

3. That the device be portable, small in size and have the advantage and capability of being unplugged from the vehicle and plugged into another vehicle.

4. That the device be inexpensive, that is, of the lowest possible cost without sacrificing the quality of the components used.

5. That the device can function constantly as an audible and visual reminder every time the vehicle ignition switch is turned on and off.

6. That there is an easy way to verify that the device is functioning properly.

7. That no batteries be required to operate the device, to give peace of mind to the parents of a child who might from time to time be riding in the vehicle, because in a child protection device will not fail because batteries have not been timely replaced.

8. That the device be reliable, since the device performs the immensely important function of protecting a child's life. In order for a system to be most reliable, it has to perform its required functions under stated conditions for a specified period of time.

It is thus an object of the present invention to provide a reminder device for a motor vehicle which alerts a driver or parent with an audio and visual signal when the vehicle ignition is shut off to remind the driver that a child (pet) may be inside the vehicle.

It is another object of the present invention to provide such a reminder device which stores electric power from the vehicle electrical system each time it is used without a battery, so that the device will never fail to operate because of a low battery, and so that the absence of a battery and the small size of the capacitor (optionally such as one rated at 6 volts DC) provided to store power makes the device light weight and compact.

It is another object of the present invention to provide such a reminder device which is simple and reliable in design and is inexpensive to manufacture.

It is another object of the present invention to provide such a device is readily portable.

It is another object of the present invention to provide one embodiment of such a reminder device which requires no installation and therefore does not alter the internal wiring or technology of the vehicle but rather manually plugs into any of the accessory receptacles.

It is another object of the present invention to provide such a reminder device which can detect the presence of a child in the car seat when the ignition switch is turned off, without then requiring the vehicle battery or external batteries to become energized.

It is another object of the present invention to provide such a reminder device in which no voltage or high current flows under the child car seat while the vehicle is in operation.

It is another object of the present invention to provide such a reminder device which can energize a radio frequency transmitter (wireless transmitter) for the purpose of activating a remote receiver.

It is another object of the present invention to provide such a reminder device which can be unplugged from one vehicle and plug into another vehicle.

It is another object of the present invention to provide such a reminder device which can provide the options of using the invention for reminding purposes, (look before you lock the door) or for reminding that a child is definitely inside the vehicle.

It is another object of the present invention to provide such a reminder device which, in order to verify its operation can be done (while the ignition switch is turned on) by simply unplugging the unit from the receptacle or socket into which it is plugged and holding it in the person hand, so that the device produces an audio and visual signal in the same way it does when the vehicle ignition is turned off.

It is another object of the present invention to provide such a reminder device which can be purchase across the counter.

It is another object of the present invention to provide an alternative embodiment of such a device which can be incorporated into a vehicle during vehicle manufacture, so that it does not occupy an accessory receptacle.

The present invention is of novel construction and meets the above requirements and more.

Further objects and advantages of the present invention will be apparent from the following detailed description of the presently preferred embodiment which is illustrated schematically in the accompanying drawings.

SUMMARY OF THE INVENTION

The present invention accomplishes the above-stated objectives, as well as others, as may be determined by a fair reading and interpretation of the entire specification.

A reminder apparatus is provided for generating an alert that a child may be in a vehicle having an ignition switch after the ignition switch is turned off, where the vehicle includes a vehicle accessory receptacle with a vehicle accessory receptacle circuit activated by the ignition switch, the apparatus including an alert generating circuit comprising power connection means for connecting the alert generating circuit to a vehicle accessory receptacle circuit; and a power delivery line extending from the power connection means, the power delivery line including a relay line extending to a relay, and a storage capacitor line extending to a power storage capacitor, through a blocking diode which prevents current from flowing from the power storage capacitor back to the power connection means, the storage capacitor line extending from the storage capacitor to the relay, and an alerting device line extending from the relay to an alerting device; such that turning on the ignition switch causes current to flow to and energize the vehicle receptacle circuit, and thereupon to flow through the power delivery line from the vehicle receptacle circuit to the power storage capacitor, charging the power storage capacitor, and to flow to the relay, causing the relay to open the alert generating circuit between the capacitor line and the alerting device line; and such that turning off the ignition switch discontinues current flow to the relay, thereby closing a relay circuit between the capacitor line and the alerting device, permitting the power storage capacitor to discharge through the alerting device line and through the alerting device, thereby energizing and activating the alerting device to generate one of an audio and a visual alert until the charge stored in the power storage capacitor is depleted.

Where the vehicle contains a child car seat, the apparatus preferably additionally includes a child car seat detection switch in the child car seat which closes when a child is placed in the child car seat and opens when the child is removed from the child car seat; a car seat connector for a child car seat detection switch in the alerting device line; and a child car seat line extending from the car seat connector to the child seat detection switch; such that current flows from the power storage capacitor through the relay to the alerting device to activate the alerting device only when both the ignition switch is turned off and the child car seat detector switch is closed as a result of the presence of a child in the child car seat.

The reminder apparatus, where the child car set detection switch optionally includes a weight activated switch. The car seat connector preferably includes a car seat jack.

The power connection means optionally is a hard wired electrical connection installed during vehicle manufacture between the vehicle accessory receptacle circuit and the power delivery line. The power connection means optionally is a plug-in connector for fitting into a vehicle accessory receptacle and thereby making electrical connection with the vehicle accessory receptacle circuit. The power connection means optionally includes a plug-in connector having a first contact and a second contact for plugging into a vehicle accessory receptacle, so that the first contact makes contact with a positive potential inside the receptacle and the second contact makes contact with a negative ground connection within the receptacle.

The reminder apparatus optionally additionally includes a wireless receiver for a vehicle occupant to carry and a wireless transmitter electrically connected to the alerting device; such that activation of the alerting device simultaneously activates the wireless transmitter to send a wireless signal to the wireless receiver to alert a person remote from the vehicle that a child may be inside the vehicle after the ignition is turned off.

The reminder apparatus preferably additionally includes a voltage regulator for regulating voltage for the alert generating circuit. The relay preferably is a solid state relay.

The alerting device optionally includes an audio alerting device, and a visual alerting device. A visual alerting device preferably includes an LED.

The apparatus preferably additionally includes a fuse between the power connection means and the power storage capacitor for de-energizing the alert generating circuit in the event of a power surge.

Such a reminder apparatus preferably is provided wherein, when the ignition switch is turned on, the alerting device will generate an alert momentarily to indicate to a vehicle occupant that the control system is armed. The reminder apparatus preferably additionally includes an LED light means for indicating continuously to an occupant of a vehicle that the reminder apparatus is armed. The alert generating circuit preferably can be tested for operational purposes by unplugging it from a vehicle receptacle while the ignition switch is turned on, and holding it in the person's hand, such that the alert generating circuit operates in the same manner as when it is plugged into the vehicle receptacle when the ignition switch is turned off.

The reminder apparatus preferably additionally includes a two tone signal circuit, where the charged power storage capacitor discharges current through the storage capacitor line and through the closed relay, through transistor line to the emitter of a transistor and also through integrated circuit line to an integrated circuit, which is the input voltage of the integrated circuit, and at this moment the integrated circuit is energized, turning on switching transistor through a resistor and when the switching transistor is turned on, the voltage coming from the charged power storage capacitor, switches from the emitter to the collector, current flows through closed contacts the jack connector, energizing the alerting device which produces an alert, and at the same time, current flows from the collector of the transistor through a junction line, through a resistor, through a blocking diode to an LED which flashes intermittently, and a blocking diode prevents the power storage capacitor from discharging through a resistor and the rest of the circuit to ground.

A reminder apparatus is further provided, such that when plug in to the vehicle accessories receptacle and the vehicle ignition switch is turned on, will charge a capacitor, and when the vehicle ignition switch is turned off, will discharge such capacitor through a signaling device or circuit producing an alarm signal that will remind the parents or the driver of a vehicle that a child or a pet might be inside the vehicle. The alarm signal preferably is one of an audio signal and a visual signal.

The present invention further relates to a system for reminding parents or a driver of a vehicle that a child (or pet) is or might be inside the vehicle. As noted, infants left inside a vehicle can die of hyperthermia in a short period of time, even when the temperature outside of the vehicle is not especially hot. This is a tragedy that kills many children every year in the United States of America and in many other places in throughout the world, and is probably the result of forgetfulness rather than neglect. This happens when distracted and responsible parents inadvertently leave a child inside the vehicle.

A portable control system reminder device is therefore provided that, when plugged into a vehicle accessory receptacle or socket and the vehicle ignition switch is turned on, will charge a capacitor within the device, and when the vehicle ignition switch is turned off, will discharge this capacitor through a signaling device or circuit producing an alarm signal that will remind the parents or the driver of a vehicle that a child or a pet might be inside the vehicle. A voltage regulator preferably is provided to regulate the voltage for the system. A blocking diode is also preferably provided for preventing the capacitor when charged from discharging through other components of the circuit rather than or instead through the signaling device or the intended circuit when the vehicle ignition switch is turned off.

A portable control system reminder is provided such that when plug into the vehicle receptacle (socket) and the ignition switch is turned on, will sound momentarily to indicate to the parents or the driver of the vehicle that the control system is armed. The portable control system reminder preferably includes an LED light that indicates continuously to the parents or the driver of a vehicle that the control system is armed.

The portable control system reminder preferably includes a solid state relay which, when energized and while the vehicle ignition switch is turned on, will open the circuit between the signaling device or circuit and the charged capacitor, preventing the signaling device from continuing to energize when the vehicle ignition switch is turned on. When the ignition switch of the vehicle is turned off, the solid state relay de-energizes and the circuit between the charged capacitor and the signaling device is closed (by the solid state relay), permitting the charged capacitor to be discharged through the signaling device or through the circuit producing the tone signal desired.

The portable control system reminder is tested for operational purposes by unplugging it from the vehicle receptacle (socket) while the ignition switch is turned on, and the person testing the reminder holding it in his or her hand. The control system operates in the hand of the person in the same manner as when it is plugged into the receptacle (socket) and the ignition switch is turned off. Benefits of the device include that it requires no batteries, no installation and no programming. Further benefits are that it can be manufactured with several different tone signals, and can be unplugged from one vehicle and then transferred to and plugged in into another vehicle, it can be purchased across the counter, and it can be used for reminding purposes, such as looking before locking the door, and for reminding the driver or parent that a child is definitely inside the vehicle.

BRIEF DESCRIPTION OF THE DRAWINGS

Various other objects, advantages, and features of the invention will become apparent to those skilled in the art from the following discussion taken in conjunction with the following drawings, in which.

Figure 1:
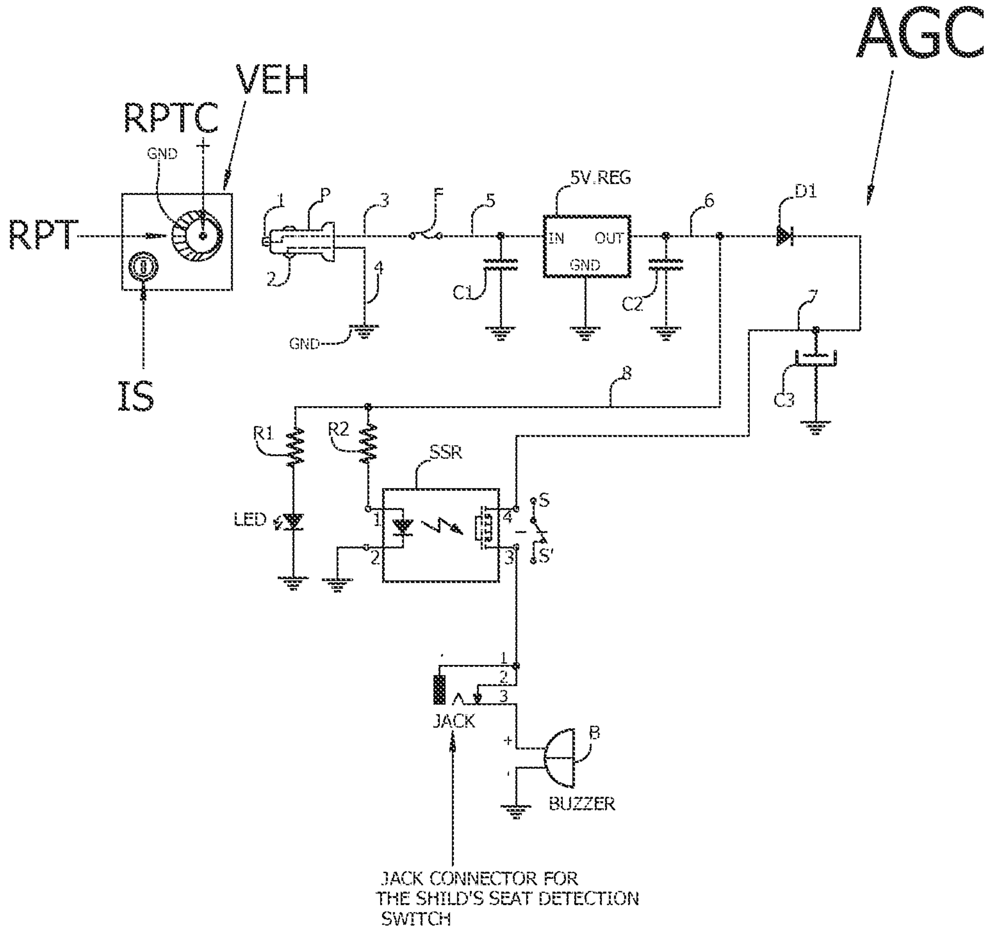
FIG. 1 is a schematic electrical circuit diagram for the basic unit.

Before explaining the disclosure embodiment of the present invention in detail, it is to be understood that the invention is not limited in its application to the details of the particular arrangement shown since the invention is capable of other embodiments. Also the terminology used herein is for the purpose of description and not of limitation.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Embodiment of FIG. 1

Referring to FIGS. 1-5, a reminder device 10 is disclosed. A first embodiment of device 10 is the basic unit as illustrated schematically in FIG. 1.

As it is well known, vehicles VEH including most cars and the models that are called Service Utility Vehicles (SUV) are manufactured with two or more accessory receptacles RPT or sockets for the purpose of plugging in, for example, a battery charger to charge cell phones or an air pump to pump air into a flat tire, or to function as a cigarette lighter or to perform other functions. The accessory receptacles RPT have vehicle accessory receptacle circuits RPTC and are energized only when the vehicle ignition switch IS is turned on with the purpose of thereby to a destination. When the ignition switch IS is turned off with the intention of leaving the vehicle the power (voltage) is cut off from all the accessory receptacles RPT. The present invention is intended, but not limited to being plugged into any of those accessory receptacles RPT for its operation without batteries, and includes an alert generating circuit AGC having power connector means preferably in the form of a plug-in connector P.

Thus, as noted, all vehicle accessory receptacles RPT are energized when the vehicle engine ignition switch IS is turned to its on position. When plug-in connector P is plugged into a vehicle accessory receptacle RPT, contact 1 will get in contact with the positive (+) potential inside the receptacle RPT. Contact 2 will get in contact with the negative (−) ground connection. See FIG. 1.

When the accessory receptacle RPT is energized, current flows from contact 1 of the plug in connector P through a power delivery line comprising lines 3, 5 and 6, and thus flows through line 3, through the fuse F, through the 5 VDC voltage regulator 5V REG, and through line 6. When the current flow reaches line 6, it will also flow through relay line 8, simultaneously it will flow through diode D1, through storage capacitor line 7, (which at this moment starts charging the power storage capacitor C3, which will remain charged as long the ignition switch IS is on) through closed circuit of pin 4 and pin 3 of the solid state relay SSR and through the normally closed contact 2 and 3 of the jack connector, through a buzzer B of known design and to ground GND. At this moment, the buzzer B will sound momentarily, as described below. When current starts flowing through relay line 8 as explained before, it also flows through resistor R2, through pin numbers 1 and 2 of the normally closed solid state relay SSR and ground GND energizing it. When the normally closed solid state relay SSR is energized, its circuits S and S' open, preventing the buzzer B from continuing to sound when the vehicle ignition switch IS is turned on. Simultaneously, current also flows through resistor R1, through the LED to ground turning the LED on.

As it has been disclosed so far, when the vehicle ignition switch IS is turned on and current starts flowing as explained, power storage capacitor C3 charges. Simultaneously, current flows through relay line 8 and the normally closed solid state relay SSR, energizing it to prevent the operation of the buzzer B while the ignition switch IS is turned on.

When the operator of the vehicle turns the ignition switch IS off, the accessory receptacle RPT is turned off (de-energized), as well as the plug-in connector P. With no voltage on the plug in connector P, in the 5V voltage regulator, in storage capacitor line 7, in resistor R2 and in pin 1 of the normally closed solid state relay SSR, the normally closed solid state relay SSR will de-energize closing switch circuit S and S'. When this happens, the charged power storage capacitor C3 discharges through the buzzer B, producing the sound reminder to alert the parents or the driver of the vehicle. As it can be appreciated, the charged power storage capacitor C3, supplies the voltage needed through storage capacitor line 7, contacts 4 and 3, of the normally closed solid state relay SSR, through the normally closed contact of the jack connector and to the positive (+) side of the buzzer B to be energized. When the buzzer B is energized it produces the desired sound reminder. The negative (−) side of the buzzer B is connected to ground GND.

Figure 3:
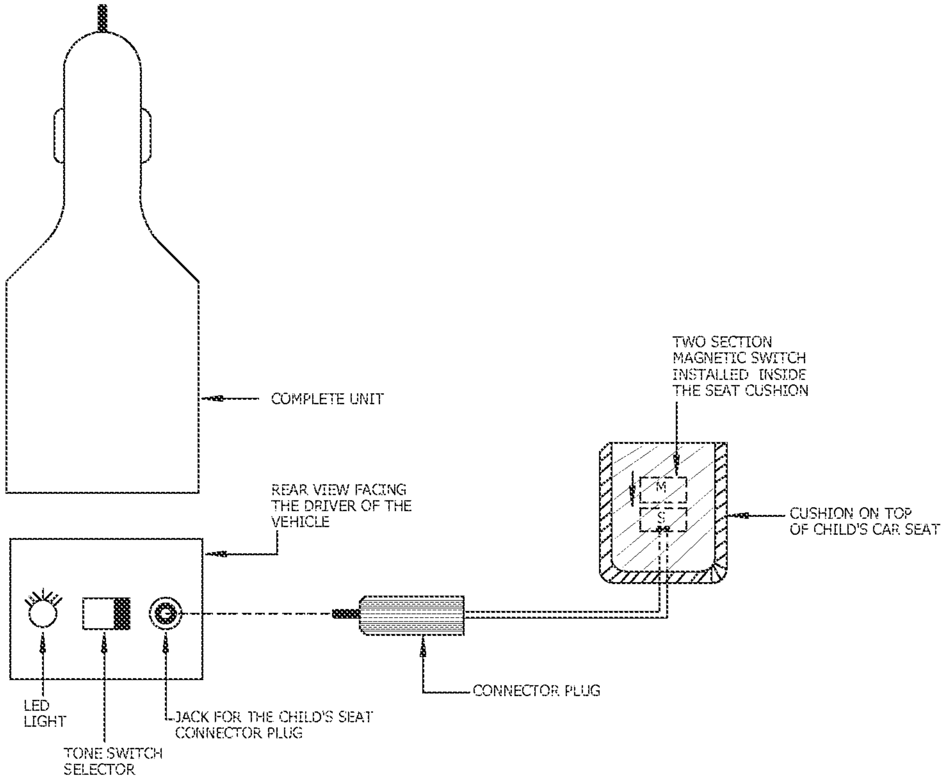
FIG. 3 is a schematic electrical circuit diagram for the child seat detection embodiment.

The buzzer B will continues to produce the desired sound reminder for a period of time long enough to attract the attention of and remind the driver of the vehicle that a child (or pet) might be in the vehicle. The time that the power storage capacitor C3 remains charged to energize buzzer B, depends on the capacitance of the capacitor C3, the highest the capacitance the longer the time the buzzer B will sound. The jack connector is for the purpose of a second option of the invention to plug in the child detection switch as shown in FIG. 3

It is important to describe the function of blocking diode D1. Diode D1 will block the current flow from the power storage capacitor C3 to the rest of the circuit in line 6 and 8 to ground, preventing capacitor C3 from losing charge.

Figure 2:
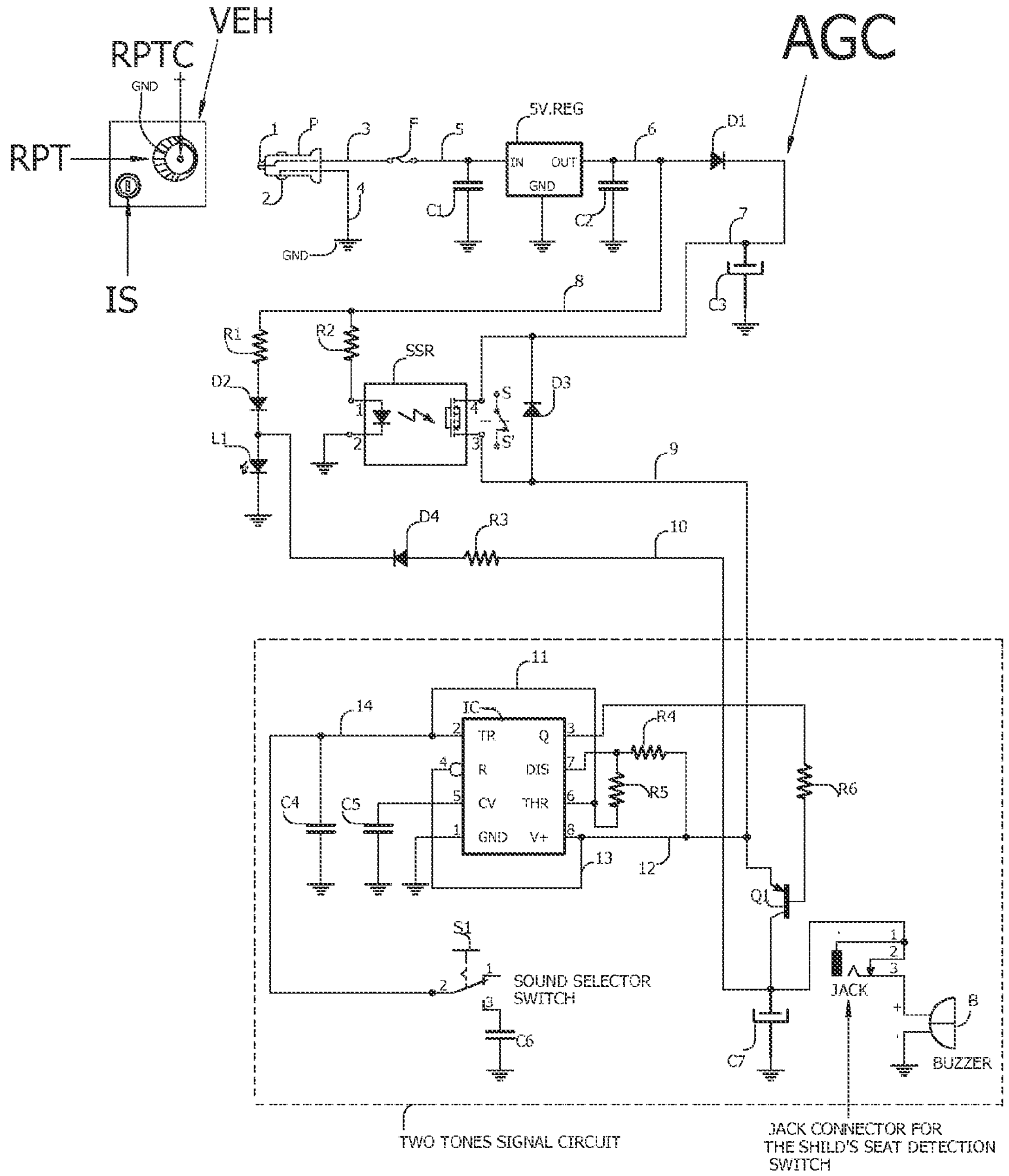
FIG. 2 is a schematic electrical circuit diagram for the main unit.

Embodiment of FIG. 2 (The Main Unit)

This embodiment shows the addition of a two tone signal circuit to the same invention.

Operation of this section of the invention is as follows. As previously disclosed, when the vehicle ignition switch IS is turned off, the normally closed solid state relay SSR simultaneously de-energizes. When this happens the circuit of this relay S and S' closes, and current from the charged capacitor C3 flows through the circuit S and S' of the normally close solid state relay SSR, through transistor line 9 to the emitter of the PNP transistor Q1, then through integrated circuit line 12, to pin number 8 of the integrated circuit IC. Pin 8 of the integrated circuit IC is connected to pin number 4 and pin number 1 is connected to ground GND, pin number 2, which is the trigger of the integrated circuit IC is connected to pin 6 which is the threshold. Pin 2 has a capacitor C4 connected to ground GND and also is connected through line 14 to the common contact 2 of sound selector switch S1. Pin 3 of the integrated circuit IC, which is the output, is connected through resistor R6 to the base of Q1, pin number 5, the control voltage has a capacitor C5 connected to ground, pin number 6 of the integrated circuit IC, which is connected to pin number 2, as previously indicated, has a resistor R5 connected to pin number 7. Pin number 7 which is the discharge, has a resistor R4 connected to pin number 8. The selector switch S1 has a capacitor C6 connected to ground GND from its normally open contact. PNP transistor Q1 has buzzer B and a capacitor C7 connected to ground GND from the collector. Resistor R3 and diode D4 are connected through junction line 10 to the junction of diode D2 and LED light L1.

As previously indicated, when the vehicle ignition switch IS is turned off, the normally closed solid state relay SSR is turned off and its circuits S and S' close. In this embodiment, the charged power storage capacitor C3 current flows through the line 7 and through the closed circuit S and S' of the solid state relay SSR, through line 9 to the emitter of transistor Q1 and also through line 12 to pin number 8 of the integrated circuit IC which is the input voltage of the IC. At this moment the integrated circuit IC is energized, turning on switching transistor Q1 through resistor R6. When the switching transistor Q1 is turned on, the voltage coming from the charged capacitor C3, as previously explained, switches from the emitter to the collector, current flows through the closed contact 2 and 3 of the jack connector energizing the buzzer B which produces the desired intermittent sound. At the same time, current flows from the collector of Q1 through line 10, through resistor R3, through blocking diode D4 to the LED L1 which flashes intermittently. Blocking diode D2 prevents power storage capacitor C3 from being discharged through R1 and the rest of the circuit to ground. As has been disclosed, LED Led1 has two functions. First, when the ignition switch IS is turned on initially produces a steady light and second when the ignition switch IS is turned off, produces an intermittent or flashing light.

The integrated circuit IC is a highly stable device of known design for generating accurate oscillation. For a stable operation as an oscillator which is the application in the present invention, the free running frequency and duty cycle are accurately controlled by the external resistors R4, R5 and capacitor C4. To control the frequency and the duty cycle, a second capacitor C6 and a selector switch have been added with the purpose of selecting between two different frequencies. When the selector switch S1 common contact 2 is in contact with contact 3, this connects capacitor C6 in parallel with capacitor C4 to increase the capacitance, making the frequency to drop. It is noted that the higher the capacitance the lower the frequency. It can be seen that in the present invention the parents or driver of the vehicle can select between two different tone signals.

Embodiment in FIG. 3 (Child Seat Detection Embodiment)

In this embodiment, a seat cushion with an open contact magnetic switch is added to the invention. A normally open push switch can be used also, but a magnetic switch is preferable for this application because it is more reliable. Also, the magnetic switch has the advantage of not depending on direct pressure or force to close its contact. It will operate when the magnet section of the switch is closed to the other section of the switch which has the contacts. The switch can operate as far as one inch apart from the magnet and is connected through the connector plug to the jack connector as shown in the schematic diagram of this section.

Description of the Seat Cushion that is Placed on Top of the Child Car Seat.

The seat cushion is made of foam material. The two sections of the magnetic switch M (for the magnet) and S (for switch) are placed apart from each other in the center of the seat. The M section goes on top and the S section goes on the bottom as shown. When the child is seated on the seat cushion, the weight of the child pushes down section M toward section S as the arrow indicates. When the section M is about one inch apart from the section S, the magnetic field of the magnet will activate the normally open contacts of the switch S. When this happens, the contacts close. When these contacts are closed and the connector plug connected to the jack connector, and a child is seated on the seat cushion, the Buzzer B will sound to alert the driver of the vehicle that a child is inside the vehicle.

Figure 4:
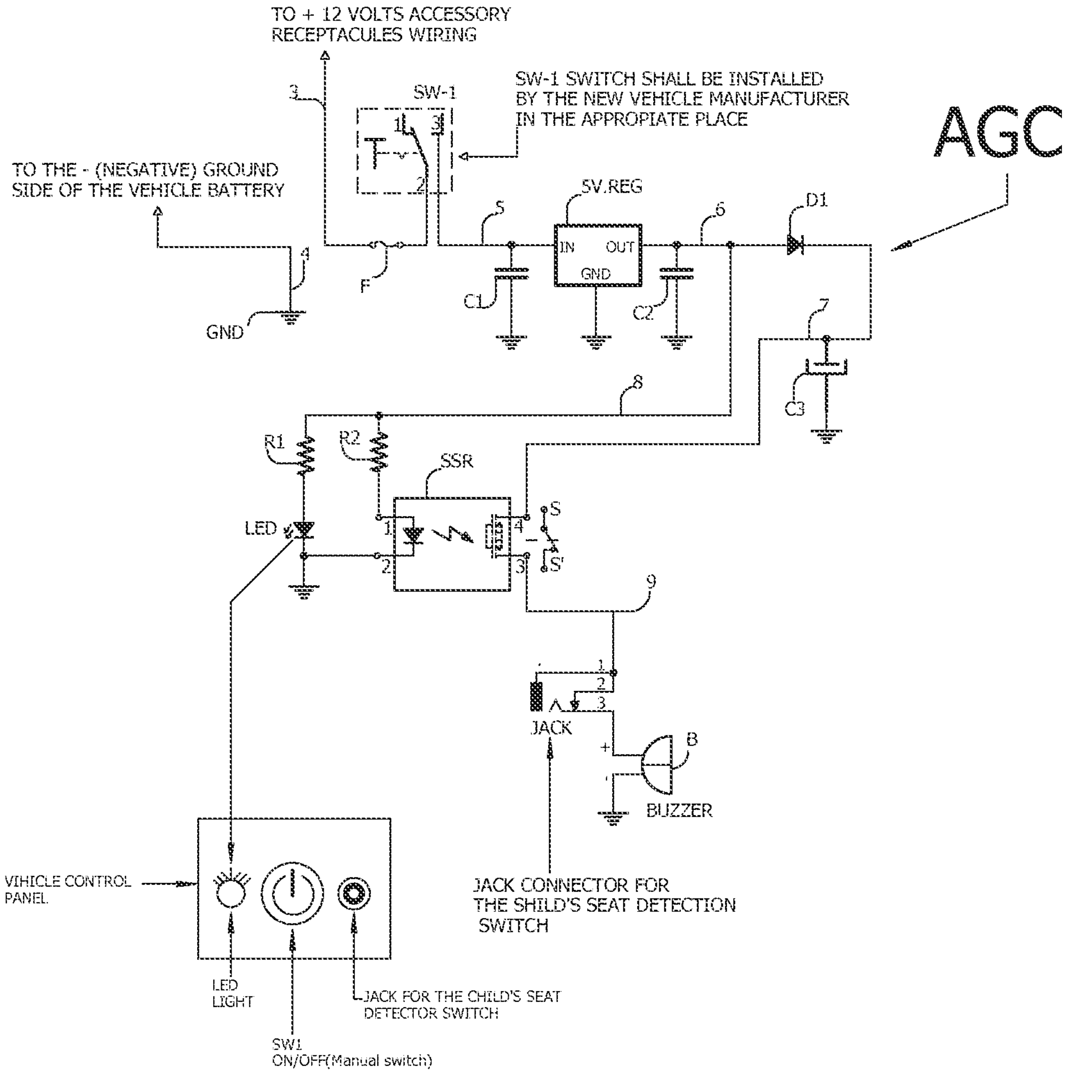
FIG. 4 is a schematic electrical circuit diagram for the embodiment of the device which is installed during vehicle manufacture so that it is integrated into the ignition circuit rather than plugging an accessory receptacle or socket.

Embodiment of FIG. 4

This embodiment is intended for but not limited to automakers. It is believed that what most parents or caregivers want is a reminder unit rather than a complicated child detection unit. It is also important to note that automakers may be reluctant to or have concerns about the manufacture vehicles with car seat detection systems because of liability issues. The present invention solves this problem because a reminder unit like this one has a switch that has to be turned on and off by the parents or caregivers which is their responsibility. Also the new vehicle can be manufacture with a jack connector as shown in FIG. 4 for the purpose of plugging in a child detection switch of the parent's choice. In this way the inventor understands that the automakers are not responsible for the actions of parents. It is also a key feature of the present invention that the device self-checks every time the ignition switch IS is turned on and then off.

In this embodiment the plug-in connector of the previously described embodiments is eliminated. The schematic shows the places where the wires to receive power from the vehicle electrical system are preferably connected. A manual device activation switch preferably is provided so that automakers can install the device in the most appropriate place in the vehicle, which preferably would be in the dashboard. The switch is preferably labeled "reminder" or is marked with an icon or symbol for such purpose. Preferable the LED in the circuit is installed next to the switch to indicate when the switch is in the on or off position. Instead of a manual toggle switch an electronic switch, can be used.

Figure 5:
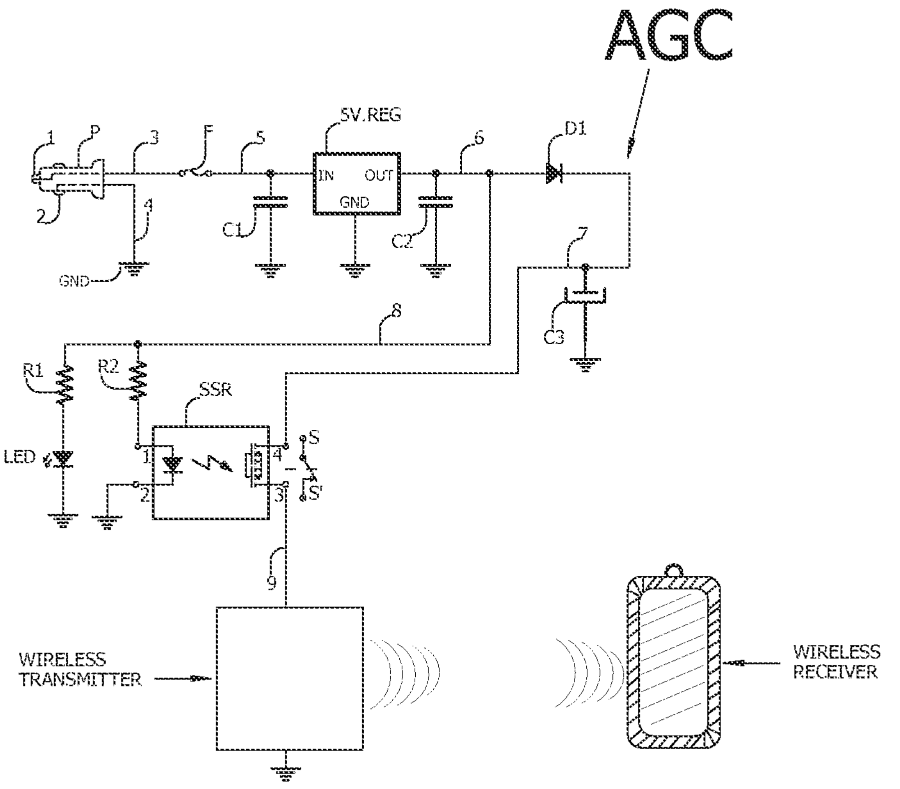
FIG. 5 is a schematic electrical circuit diagram for the embodiment of the device which includes a wireless transmitter and receiver.

Embodiment of FIG. 5

In this embodiment, compared to the embodiment shown in FIG. 1, the only change is that is that buzzer B is replaced with a wireless transmitter. The purpose of the wireless transmitter is to transmit a radio frequency signal to a remote receiver.

Figure 6:
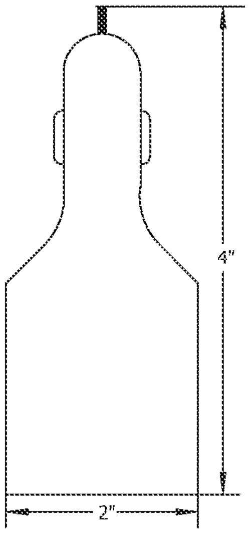
FIG. 6 is a side plan view of the preferred device housing showing preferred dimensions. These dimensions are understood to be exemplary only and in way limiting, since many other dimensions and housing shapes are contemplated.

Embodiment of FIG. 6

FIG. 6 shows the preferred approximate dimensions of a typical unit of the present invention.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A reminder apparatus for generating an alert that a child may be in a vehicle having an ignition switch after the ignition switch is turned off, wherein the vehicle includes a vehicle accessory receptacle with a vehicle accessory receptacle circuit activated by the ignition switch, comprising:

an alert generating circuit comprising power connection means for connecting said alert generating circuit to a vehicle accessory receptacle circuit;

and a power delivery line extending from said power connection means, said power delivery line comprising a relay line extending to a relay, and a storage capacitor line extending to a power storage capacitor, through a blocking diode which prevents current from flowing from said power storage capacitor back to said power connection means, said storage capacitor line extending from said storage capacitor to said relay, and an alerting device line extending from said relay to an alerting device;

wherein turning on the ignition switch causes current to flow to and energize the vehicle receptacle circuit, and thereupon to flow through said power delivery line from the vehicle receptacle circuit to said power storage capacitor, charging said power storage capacitor, and to flow to said relay, causing said relay to open the alert generating circuit between said capacitor line and said alerting device line;

and wherein turning off the ignition switch discontinues current flow to said relay, thereby closing a relay circuit between said capacitor line and said alerting device, permitting said power storage capacitor to discharge through said alerting device line and through said alerting device, thereby energizing and activating said alerting device to generate one of an audio and a visual alert until the charge stored in said power storage capacitor is depleted.

2. The reminder apparatus of claim 1, wherein the vehicle contains a child car seat, additionally comprising:

a child car seat detection switch in the child car seat which closes when a child is placed in the child car seat and opens when the child is removed from the child car seat;

a car seat connector for a child car seat detection switch in said alerting device line;

and a child car seat line extending from said car seat connector to said child seat detection switch;

wherein current flows from said power storage capacitor through said relay to said alerting device to activate said alerting device only when both the ignition switch is turned off and the child car seat detector switch is closed as a result of the presence of a child in the child car seat.

3. The reminder apparatus of claim 2, wherein said child car set detection switch comprises a weight activated switch.

4. The reminder apparatus of claim 2, wherein said car seat connector comprises a car seat jack.

5. The reminder apparatus of claim 1, wherein said power connection means is a hard wired electrical connection installed during vehicle manufacture between the vehicle accessory receptacle circuit and said power delivery line.

6. The reminder apparatus of claim 1, wherein said power connection means is a plug-in connector for fitting into a vehicle accessory receptacle and thereby making electrical connection with the vehicle accessory receptacle circuit.

7. The apparatus of claim 6, wherein said power connection means comprises a plug-in connector having a first contact and a second contact for plugging into a vehicle accessory receptacle, such that said first contact makes contact with a positive potential inside said receptacle and said second contact makes contact with a negative ground connection within said receptacle.

8. The reminder apparatus of claim 1, additionally comprising:

a wireless receiver for a vehicle occupant to carry and a wireless transmitter electrically connected to said alerting device;

wherein activation of said alerting device simultaneously activates said wireless transmitter to send a wireless signal to said wireless receiver to alert a person remote from the vehicle that a child may be inside the vehicle after the ignition is turned off.

9. The reminder apparatus of claim 1 additionally comprising a voltage regulator for regulating voltage for said alert generating circuit.

10. The reminder apparatus of claim 1, wherein said relay is a solid state relay.

11. The reminder apparatus of claim 1, wherein said alerting device comprises an audio alerting device.

12. The reminder apparatus of claim 1, wherein said alerting device comprises a visual alerting device.

13. The reminder apparatus of claim 12, wherein said visual alerting device comprises an LED.

14. The apparatus of claim 1, additionally comprising a fuse between said power connection means and said power storage capacitor for de-energizing said alert generating circuit in the event of a power surge.

15. The reminder apparatus of claim 1, wherein, when the ignition switch is turned on, said alerting device will generate an alert momentarily to indicate to a vehicle occupant that the control system is armed.

16. The reminder apparatus of claim 1, additionally comprising an LED light means for indicating continuously to an occupant of a vehicle that the reminder apparatus is armed.

17. The reminder apparatus of claim 1, wherein said alert generating circuit can be tested for operational purposes by unplugging it from a vehicle receptacle while the ignition switch is turned on, and holding it in the person's hand, such that said alert generating circuit operates in the same manner as when it is plugged into the vehicle receptacle when the ignition switch is turned off.

18. The reminder apparatus of claim 1, additionally comprising a two tone signal circuit, wherein the charged power storage capacitor discharges current through the storage capacitor line and through the closed circuit of the relay, through transistor line to the emitter of transistor and also through integrated circuit line to an integrated circuit, which is the input voltage of the integrated circuit, and at this moment the integrated circuit is energized, turning on switching transistor through a resistor and when the switching transistor is turned on, the voltage coming from the charged power storage capacitor, switches from the emitter to the collector, current flows through closed contacts the jack connector, energizing said alerting device which produces an alert, and at the same time, current flows from the collector of the transistor through a junction line, through a resistor, through a blocking diode to an LED which flashes intermittently, and a blocking diode prevents the power storage capacitor from discharging through a resistor and the rest of the circuit to ground.

19. A reminder apparatus, for generating an alert that a child may be in a vehicle having an ignition switch after the ignition switch is turned off, comprising:

an alert generating circuit comprising power connection means for connecting said alert generating circuit to said vehicle ignition switch;

and a power delivery line extending from said power connection means extending to a blocking diode, and a storage capacitor line extending from said blocking diode to a power storage capacitor, said blocking diode preventing current from flowing from said power storage capacitor back to said power connection means, and an alerting device line extending from said power storage capacitor to an alerting device;

wherein when plugged in to the vehicle accessories receptacle and the vehicle ignition switch is turned on, will charge a capacitor, and when the vehicle ignition switch is turned off, the energy stored in such capacitor will energize a signaling device or circuit producing an alarm signal that will remind the parents or the driver of a vehicle that a child or a pet might be inside the vehicle.

20. The reminder apparatus of claim 19, wherein said alarm signal is one of an audio signal and a visual signal.

* * * * *